(12) United States Patent
Endler et al.

(10) Patent No.: US 10,944,209 B2
(45) Date of Patent: Mar. 9, 2021

(54) INSPECTION AND MAINTENANCE SYSTEM HAVING AN ELECTRICAL INTERFACE

(71) Applicant: iPEK International GmbH, Sulzberg (DE)

(72) Inventors: Hannes Endler, Kempten (DE); Harald Kaderabek, Buchenberg (DE); Simon Grimm, Kempten (DE)

(73) Assignee: iPEK International GmbH, Sulzberg (DE)

( * ) Notice: Subject to any disclaimer, the term of this patent is extended or adjusted under 35 U.S.C. 154(b) by 0 days.

(21) Appl. No.: 15/973,833

(22) Filed: May 8, 2018

(65) Prior Publication Data

US 2018/0331467 A1 Nov. 15, 2018

(30) Foreign Application Priority Data

May 10, 2017 (DE) ...................... 20 2017 102 821.6

(51) Int. Cl.
*H01R 13/62* (2006.01)
*H02J 7/00* (2006.01)
(Continued)

(52) U.S. Cl.
CPC ..... *H01R 13/6205* (2013.01); *H01R 13/2478* (2013.01); *H01R 13/64* (2013.01);
(Continued)

(58) Field of Classification Search
CPC ............ H01R 13/6205; H01R 13/6276; H01R 13/64; H01R 13/2485; H01R 13/2478; H01R 33/18
(Continued)

(56) References Cited

U.S. PATENT DOCUMENTS

| 4,317,969 A | * | 3/1982 | Riegler | .............. | H01R 13/6205 200/52 R |
| 4,451,113 A | * | 5/1984 | Zuniga | .............. | H01R 13/6205 439/32 |

(Continued)

FOREIGN PATENT DOCUMENTS

DE 10 2008 015 388 A1 6/2009

OTHER PUBLICATIONS

The Extended European Search Report issued for corresponding European Patent Application No. 17209142.3, dated Jun. 15, 2018, with an English translation.
(Continued)

*Primary Examiner* — Abdullah A Riyami
*Assistant Examiner* — Marcus E Harcum
(74) *Attorney, Agent, or Firm* — Myers Wolin, LLC

(57) ABSTRACT

An inspection or maintenance system is provided comprising an electrical interface, wherein the inspection or maintenance system comprises an inspection or maintenance unit and an external unit, which can be coupled to the inspection or maintenance unit electrically. The inspection or maintenance unit comprises a housing and the housing has a first electrically conducting portion and at least a second electrically conducting portion. The electrically conducting portions are electrically isolated from each other, the external unit comprises a first electrical contact and at least a second electrical contact, wherein the electrically conducting portions and the electrical contacts are configured such that the first electrical contact can be brought into electrical contact with the first electrically conducting portion and the at least one second electrical contact can be brought into electrical contact with the at least one second electrically conducting portion.

9 Claims, 3 Drawing Sheets

(51) Int. Cl.
*H04Q 9/00* (2006.01)
*H01R 13/24* (2006.01)
*H01R 13/64* (2006.01)
*H01R 33/18* (2006.01)
*B08B 9/04* (2006.01)

(52) U.S. Cl.
CPC ............ H01R 33/18 (2013.01); H02J 7/0027 (2013.01); H02J 7/0042 (2013.01); H04Q 9/00 (2013.01); B08B 9/04 (2013.01); *H01R 2201/20* (2013.01); *H04Q 2209/30* (2013.01); *H04Q 2209/88* (2013.01)

(58) Field of Classification Search
USPC .................................. 439/39, 289, 347, 346
See application file for complete search history.

(56) References Cited

U.S. PATENT DOCUMENTS

| | | | |
|---|---|---|---|
| 7,001,199 B1 * | 2/2006 | Badalpour | H01R 13/6276 439/348 |
| 7,125,273 B2 * | 10/2006 | Irwin | H01R 13/6276 439/180 |
| 7,540,754 B2 * | 6/2009 | Hankey | H01R 13/6276 439/348 |
| 7,566,224 B2 * | 7/2009 | Wu | H01R 13/2435 439/39 |
| 8,568,301 B2 * | 10/2013 | Watanabe | A61B 1/00128 600/132 |
| 8,894,419 B1 * | 11/2014 | Buelow | H01R 13/6205 439/218 |
| 8,939,785 B2 * | 1/2015 | Chiu | H01R 13/621 439/333 |
| 9,017,092 B1 * | 4/2015 | McCracken | H01R 13/62 439/374 |
| 9,647,385 B2 * | 5/2017 | Suh | H01R 13/6205 |
| 10,340,611 B2 * | 7/2019 | Burrow | H01R 13/04 |
| 2002/0190682 A1 | 12/2002 | Schempf et al. | |
| 2003/0082942 A1 * | 5/2003 | Wlos | H01R 13/6276 439/348 |
| 2007/0072443 A1 * | 3/2007 | Rohrbach | H01R 13/6205 439/39 |
| 2007/0087612 A1 * | 4/2007 | Tsujita | F16B 21/165 439/346 |
| 2008/0064248 A1 * | 3/2008 | Huang | H01R 13/639 439/346 |
| 2011/0177711 A1 * | 7/2011 | Park | A45D 20/12 439/347 |
| 2013/0164949 A1 | 6/2013 | Riering-Czekalla et al. | |
| 2013/0267112 A1 * | 10/2013 | Honghin | H01R 24/28 439/346 |
| 2014/0148018 A1 * | 5/2014 | Kim | H01R 13/24 439/39 |
| 2014/0220793 A1 * | 8/2014 | Yen | H01R 13/6205 439/39 |
| 2014/0235075 A1 * | 8/2014 | Kim | H01R 13/6205 439/39 |
| 2015/0062828 A1 * | 3/2015 | Shirai | H01R 13/6205 361/728 |
| 2015/0333432 A1 * | 11/2015 | Wu | H01R 13/46 439/39 |

OTHER PUBLICATIONS

Extended examination report issued by the German Patent Office for corresponding German Patent Application No. 17209142.3, dated Sep. 30, 2019, with partial machine-generated English translation attached.

* cited by examiner

INSPECTION AND MAINTENANCE SYSTEM HAVING AN ELECTRICAL INTERFACE

CROSS REFERENCE TO RELATED APPLICATIONS

This application claims priority to German Utility Model No. 20 2017 102 821.6, filed May 10, 2017, the contents of which are incorporated by reference herein.

TECHNICAL FIELD

The invention relates to an inspection and/or maintenance system having an electrical interface. In particular, the invention relates to a sewer inspection and/or maintenance system having an electrical interface.

BACKGROUND

Inspection and/or maintenance systems, in particular, for inspection and/or maintenance of sewers or sewage pipes are known in prior art. Inspection and/or maintenance units of such systems often comprise electrical components (e.g., a camera module in an inspection system or a camera module in a rinsing head), which have to be supplied with electrical energy. As far as no electrical cable is to be inserted into the sewer for the energy supply to the inspection and/or maintenance units, it is known to provide accumulators for the energy supply to the inspection and/or maintenance units.

Such accumulators have to be charged on a regular basis. For this, the accumulator is taken out of the inspection and/or maintenance units and is put into a charging device for being charged. Hereby, however, it is disadvantageous that the cover of the housing of the inspection and/or maintenance unit, behind which the accumulator is arranged, has to be built in a fluid-tight manner in order to prevent water being present in the sewer from entering. This tightness cannot be guaranteed always, in particular, after opening/closing a couple of times. Moreover, the cover of the housing during opening/closing is subject to certain wear, the latter also possibly having a negative impact on the tightness.

Alternatively, classical sockets are arranged on the inspection and/or maintenance units, in which a plug of a charging cable may be inserted. The accumulator then no longer has to be taken out of the inspection and/or maintenance units for being charged. However, also these sockets have to be arranged at the inspection and/or maintenance units in a fluid and/or gas-tight manner, the latter only being possible at a substantial additional expense on a constructive basis.

SUMMARY

Therefore, it is an object of the present invention to provide solutions, which enable realizing energy supply and/or data transmission from and to the inspection and/or maintenance units in a simple manner with respect to construction, whereby at the same time, the fluid and/or gas tightness of the inspection and/or maintenance unit is ensured.

This object is solved by an inspection and/or maintenance system according to the independent claim. Preferred embodiments of the invention are defined in the dependent claims.

Accordingly, an inspection and/or maintenance system, in particular, a sewer inspection and/or maintenance system, having an electrical interface is provided, wherein the inspection and/or a maintenance system comprises an inspection and/or maintenance unit, in particular, a sewer inspection and/or maintenance unit, and
an external unit, which may be coupled to the inspection and/or maintenance unit electrically, wherein
the inspection and/or maintenance unit comprises a housing,
the housing has a first electrically conducting portion and at least a second electrically conducting portion, wherein the electrically conducting portions are electrically insulated from each other,
the external unit has a first electrical contact and at least a second electrical contact,
wherein the electrically conducting portions and the electrical contacts are configured such that the first electrical contact may be brought into contact with the first electrically conducting portion, and the at least one second electrical contact may be brought into electrical contact with the at least one second electrically conducting portion.

The housing has at least two electrically conducting portions, i.e., also three or more electrically conducting portions may be provided, wherein each electrically conducting portion is insulated electrically from the respectively other electrically conducting portions.

Accordingly, also the external unit comprises at least two electrical contacts, i.e., also three or more electrical contacts may be provided.

Hereby, it is advantageous that no conventional plugs have to be provided for an energy transmission, as for the charging of an accumulator or for data transmission such that a potential source for fluid entry into the inspection and/or maintenance unit is eliminated. The production of a hermetically tight inspection and/or maintenance unit, thereby, is facilitated. Further, no movable parts have to be provided such that wear can be reduced substantially.

An electrical consumer and/or an energy storage, in particular, an accumulator may be arranged within the housing, and the electrically conducting portions may be coupled to the electrical consumer and/or to the energy storage.

Moreover, it is advantageous, if the two electrically conducting portions of the housing comprise, at least in portions, a magnetic or ferromagnetic material, and the external unit comprises at least one magnet, which cooperates with at least one of the magnetic portions magnetically during contacting of the electrical contacts with the electrical conducting portions.

Thereby, the external unit may be arranged at a surface of the housing, which is substantially planar, where it may be held by means of the magnets such that the two electrical contacts of the external unit are or are held in operative connection with the respective electrically conducting portion of the housing.

The tear behavior resulting from this is advantageous, i.e., also upon an unintentional or forcible removal of the external unit from the inspection and/or maintenance unit, damages neither occur at the external unit nor at the inspection and/or maintenance unit.

According to an embodiment of the invention, the housing and the external unit may be configured such that they may be coupled to each other in an interlocking and/or force-fitting manner.

The housing may comprise a recess, in which the external unit may be received at least partially in an interlocking and/or force-fitting manner.

Hereby, the external unit may comprise movable coupling members, which during coupling of the external unit and the housing, engage with corresponding coupling recesses at the housing.

An actuating means, preferably a spring member, may be assigned to the coupling members respectively. The spring member may be configured such that the coupling members, after receiving the external unit in the recess of the housing, are pushed into the coupling recesses. During removal of the external unit from the recess of the housing, the coupling members are pushed against the spring force out of the coupling recesses.

According to a preferred embodiment of the invention, the coupling members may be the electrical contacts.

The electrical contacts and the electrically conducting portions may be provided for a transmission of electrical energy.

Alternatively or additionally, at least one of the electrical contacts and at least one of the electrically conducting portions may be used for signal or data transmission.

The housing of the external unit may be configured in a fluid- and/or gas-tight manner.

The external unit may comprise at least one of a charging unit, an illuminant, a permanent power supply, an external accumulator, and a data processing means.

The electrical consumer may comprise at least one of a data processing means, an imaging means, an illuminant, a sensor, and a manipulator.

BRIEF DESCRIPTION OF THE DRAWINGS

Further details and features of the invention as well as concrete, in particular, preferred embodiments of the invention can be derived from the following description in connection with the drawing, in which.

DETAILED DESCRIPTION

The system according to the invention comprises an inspection and/or maintenance unit and an external unit.

For illustrating the invention, in the following a system is described with reference to FIG. 1 to FIG. 4, in which the external unit is a charging unit, and in which an accumulator is arranged within the housing of the inspection and/or maintenance unit, which may be charged, if needed, by means of the charging unit.

Instead of the charging unit, for example, also an electrical consumer, as an external illumination means, as will be described with reference to FIG. 5, or a data processing means for realizing data transmission via the electrical coupling may be provided as external unit. In a further example according to the invention, also an external accumulator may be provided instead of the charging unit, which, for example, may be used as emergency power supply, if the energy supply of the inspection and/or maintenance unit no longer can be ensured by the accumulator arranged within the housing of the inspection and/or maintenance unit.

Instead of the accumulator or in addition to the accumulator, an electrical consumer may also be provided within the housing, as an illumination means or an imaging means, which is supplied with electrical energy via the electrical coupling to an external accumulator. According to a further example, also a data processing means, as a micro-controller, may be arranged within the housing, wherein data transmission to an external data processing means may be effected via the electrical coupling.

All embodiments have in common that the electrical coupling between the external unit and the inspection and/or maintenance unit is created by means of electrically conducting portions of the housing of the inspection and/or maintenance unit, which are isolated from each other electrically, and by means of electrical contacts of the external unit, wherein the electrical contacts of the external unit are also insulated electrically from each other.

Figure 1:
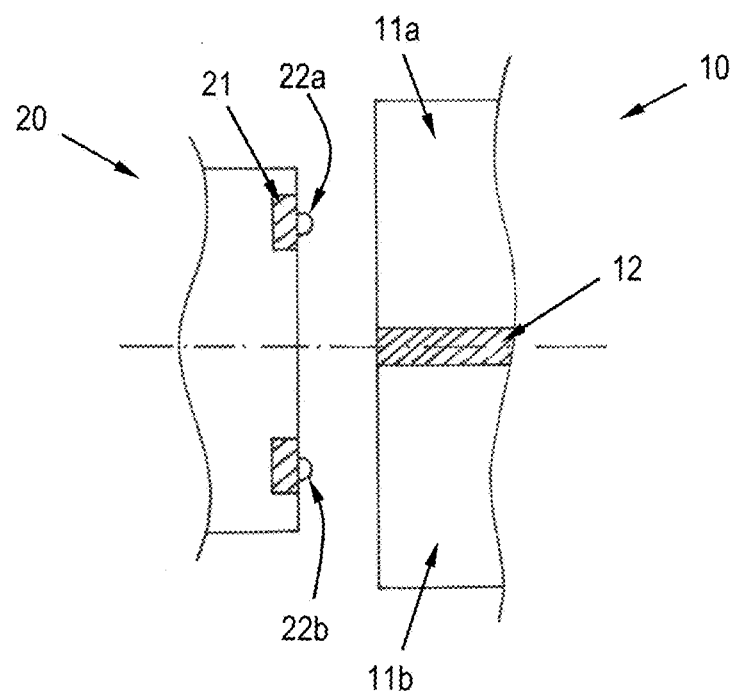
FIG. 1 shows a system according to the invention according to a first embodiment.

FIG. 1 shows a schematic sketch of a system according to the invention according to a first embodiment. The system comprises an inspection and/or maintenance unit 10 and a charging unit 20. In the following, the inspection and/or maintenance unit 10 simply is referred to as inspection unit 10, wherein the invention is not restricted to this, but rather, in principle, may also be realized in maintenance units.

The inspection unit 10 comprises a housing, in which all electrical and electronic components are accommodated, for example, a camera module and/or sensors. Further, an energy storage not shown here is accommodated within the housing, as an accumulator, which is provided for the energy supply of the electrical and electronic components.

Hereby, the housing itself preferably is configured in a fluid- and/or gas-tight manner.

According to the invention, the housing comprises a first electrically conducting portion 11a and a second electrically conducting portion 11b, which may have different electrical potentials, and which are insulated from each other electrically, for example, by means of an insulating layer 12. The housing may, however, also comprise more than two electrically conducting portions.

The electrically conducting portions 11a, 11b of the housing are coupled to the accumulator not shown here, or to corresponding charging electronics, which in turn is coupled to the accumulator such that the accumulator may be charged via the two electrically conducting portions 11a, 11b. The other portions of the housing may also consist of an electrically non-conducting material.

The electrically conducting portions 11a, 11b of the housing, hereby, provide contact points, at which the charging unit 20 may be contacted electrically, in order to apply an electrical current to the two electrical conducting portions 11a, 11b for charging the accumulator. The voltage and/or the current strengths of the electrical current provided by the charging unit 20, hereby, are set such that danger for the operator during the charging process is excluded, in case the operator inadvertently contacts the electrically conducting portions 11a, 11b of the housing.

A first electrical contact 22a and a second electrical contact 22b are arranged on the charging unit 20. These two electrical contacts 22a, 22b are configured and arranged on the charging unit 20 such that they contact the respective electrically conducting portions 11a, 11b of the housing, when advancing the charging unit 20 towards the inspection unit 10. The two electrical contacts 22a, 22b, in turn, are coupled to an electrical power supply, which provides the electrical current for the charging of the accumulator.

The two electrical contacts 22a, 22b, in the schematic sketch of FIG. 1, are formed in a slightly raised manner.

They may, however, for example, also be formed as substantially planar contact plates. The geometry of the electrical contacts 22a, 22b substantially depends on the geometry of the contact points of the electrically conducting portions 11a, 11b of the housing.

Further, according to the schematic sketch shown in FIG. 1, magnets (at least one magnet) are arranged on the charging unit 20, which during advancing the charging unit 20 towards the housing of the inspection unit 10, respectively cooperate magnetically with the electrically conducting portions 11a, 11b of the housing. Hereby, the housing comprises, at least in portions, a magnetic or ferromagnetic material. By means of the magnetic force, the charging unit 20 is then retained at the housing 10.

Also, to magnets may be arranged on the housing of the inspection unit 10, which correspond to the two magnets 21 of the charging unit. Hereby, it is advantageous, if respectively one magnet on the charging unit 20 as well as on the housing of the inspection unit 10 faces, with its positive terminal, a negative terminal of the surface of the housing or the surface of the charging unit 20. Thereby, a reverse polarity protection can be achieved during advancing the charging unit 20 towards the housing, because the magnets of the charging unit do only adhere to the magnets of the housing in one orientation (according to which the negative terminals are facing the positive terminals) of the charging unit relative to the housing.

Figure 2:
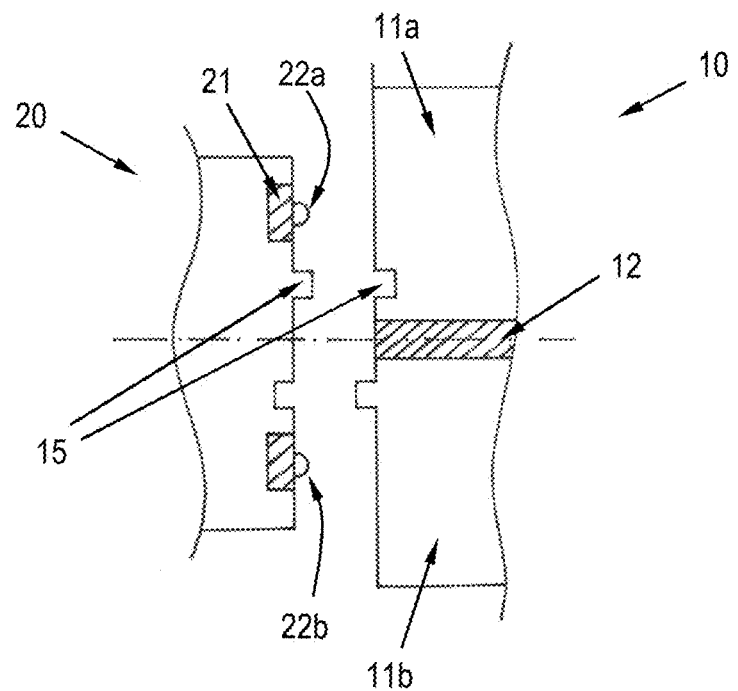
FIG. 2 shows the system of FIG. 1 with a mechanical reverse polarity protection.

FIG. 2 shows an alternative embodiment of the system of FIG. 1 on the basis of a schematic sketch. The system shown in FIG. 2 differs from the system shown in FIG. 1 only in the concrete configuration of the reverse polarity protection.

In order to ensure a reverse polarity protection, according to the embodiment of FIG. 2, a pin/groove configuration 15 is formed at the opposing surfaces of the charging unit and the housing, which only allows one type of contacting the two electrical contacts 22a, 22b with the two electrically conducting portions 11a, 11b. Accordingly, a pin is provided at the surface of the charging unit 20, which corresponds to a groove at the surface of the housing. Moreover, a groove is provided at the surface of the charging unit 20, which corresponds to a pin at the surface of the housing. Hereby, the grooves respectively are recesses or depressions on the surface, with which the respective pins may be brought into engagement. Preferably, a contacting of the two electrical contacts 22a, 22b of the charging unit with the two electrically conducting portions 11a, 11b of the housing is only possible in such a position of the charging unit relative to the housing of the inspection unit, in which the two pins engage with the respective groove.

Figure 3:
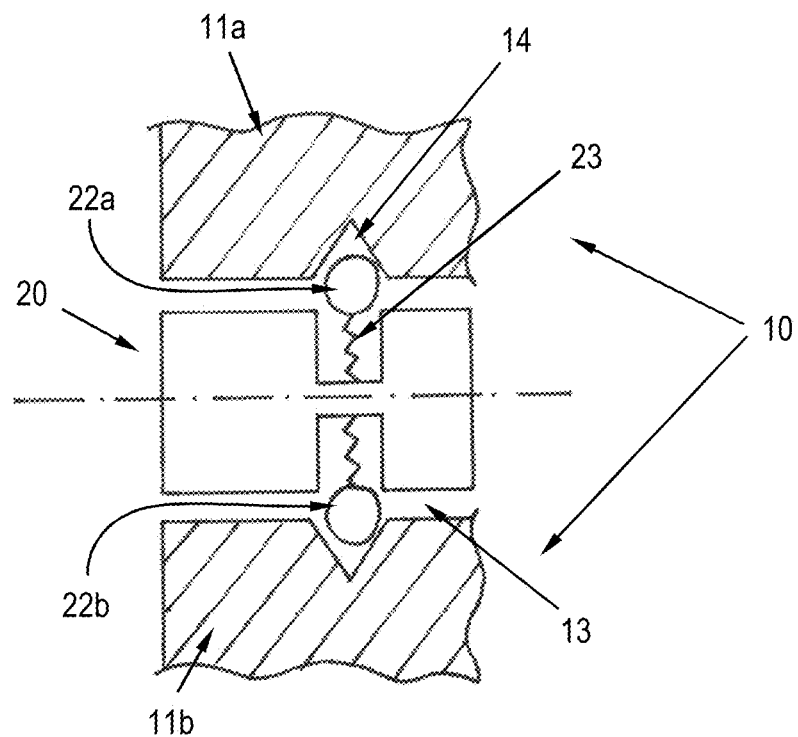
FIG. 3 shows the system according to the invention according to a further embodiment.

FIG. 3 shows a further embodiment of the system according to the invention on the basis of a schematic sketch.

Also here, the housing of the inspection unit 10 has to electrically conducting portions 11a, 11b, which are electrically insulated from each other. In contrast to the embodiment shown in FIG. 2, here, the housing has a recess 13, in which the charging unit 20 may be received at least partially by inserting the charging unit 20 into this recess 13. Here, however, the principle is the same one as for the embodiment shown in FIG. 1. Namely, the two walls of the recess 13 electrically insulated from each other respectively are a part of the electrically conducting portions 11a, 11b of the housing, which respectively are brought into contact with the electrical contacts 22a, 22b arranged on the charging unit 20, if the charging unit 20 is inserted into the recess 13.

The fixation of the charging unit 20 within the recess 13, here, may also result from magnets arranged on the charging unit 20 and on the wall of the recess.

With respect to the embodiment shown in FIG. 3, this fixation is achieved by means of electrical contacts 22a, 22b configured movably, which here are formed spherically. The spherical electrical contacts 22a, 22b are respectively arranged in a radial blind hole of the charging unit 20. The electrical contacts 22a, 22b, however, may also have another suitable geometry.

An actuating means is respectively assigned to the two electrical contacts 22a, 22b, which here is formed as a spring member 23. The electrical contacts 22a, 22b are pushed at least partially out of the respective blind hole by means of the spring members such that the portion of the electrical contacts 22a, 22b projecting from the blind hole may be brought into engagement with a wall-sided coupling recess 14. The electrical contacts 22a, 22b, hereby, are protected against falling out of the blind holes.

The electrical contacts 22a, 22b, hereby, serve two purposes. On the one hand, they contact the electrically conducting portions 11a, 11b of the housing, in order to be able to charge the accumulator arranged in the housing. On the other hand, they prevent the charging unit from being easily released from the recess 13.

According to an alternative embodiment, also separate coupling members may be provided on the charging unit, which only are used for securing the charging unit within the recess 13.

Figure 4:
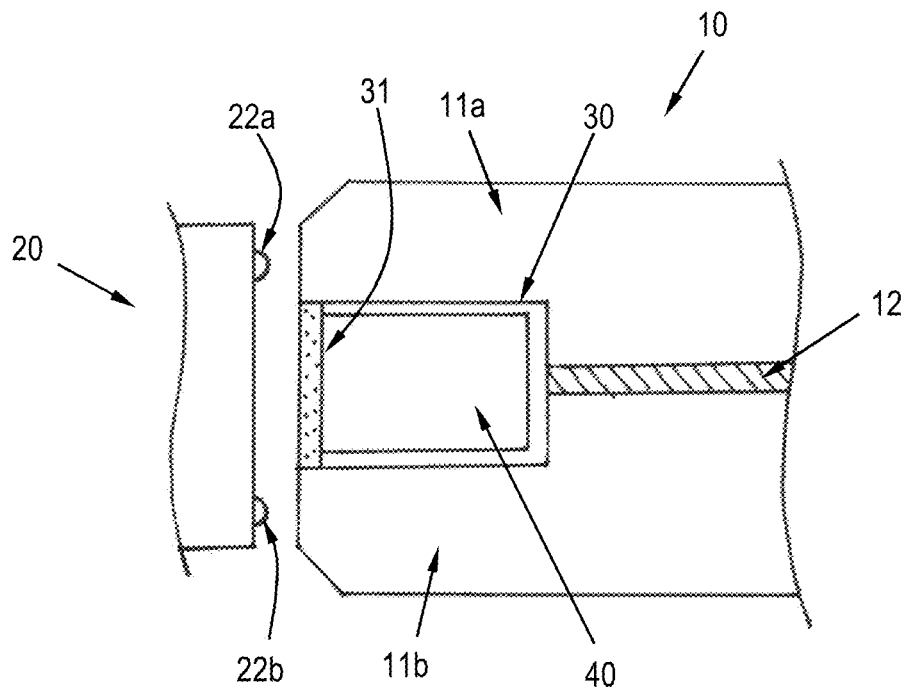
FIG. 4 shows a concrete system according to the invention.

FIG. 4 shows an example of a concrete inspection and/or maintenance unit 10, the accumulator of which may be charged according to the invention.

With respect to the inspection and/or maintenance unit 10 shown here, an inspection head is concerned, which, for example, may be attached to a front end of a push rod, and which may be advanced within the sewer and may be moved there by means of the push rod. The inspection head may, however, also be mounted on a carriage.

The inspection head 10 or the housing of the inspection head has an axial recess 30 at the distal end, in which a camera module 40 is arranged. The opening of the recess 30 is closed by means of a protection pane 31 in a gas- and/or fluid-tight manner.

The housing of the inspection head 10, here, comprises two electrically conducting portions 11a, 11b isolated from each other.

The charging unit 20 is advanced at the distal end of the inspection head 10 such that the two electrical contacts 22a, 22b contact the two electrically conducting portions 11a, 11b electrically.

The same principle as shown in FIG. 4 may, for example, be applied to a rinsing head, which besides the rinsing nozzles, also comprises electrical or electronic components, which are supplied with electrical energy by the accumulator arranged in the rinsing head.

Figure 5:
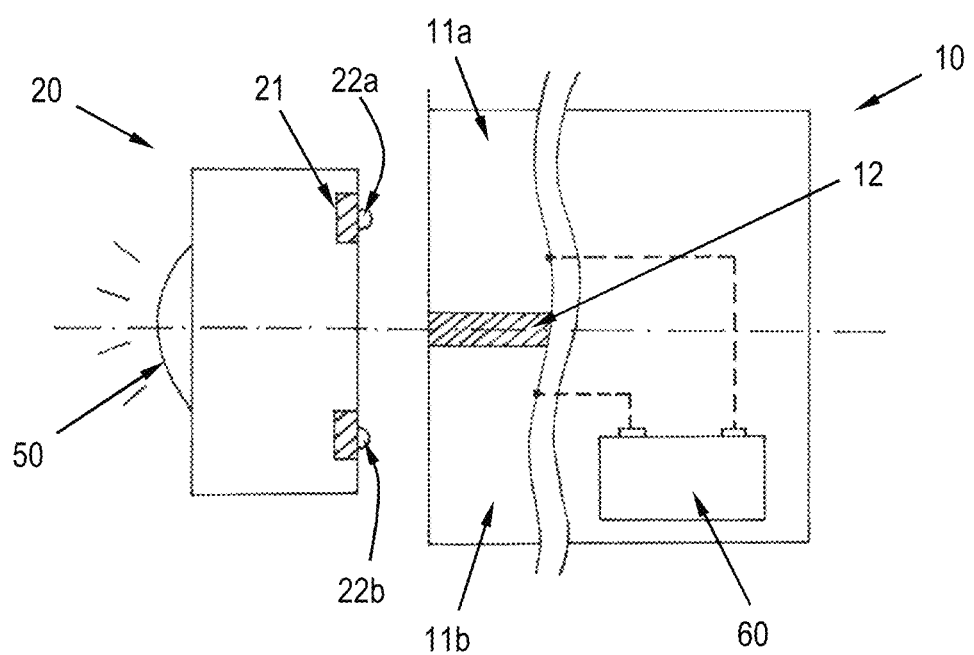
FIG. 5 shows a concrete system according to the invention, in which the external unit is an illumination means.

FIG. 5 shows a further example of a system according to the invention.

The external unit, here, comprises an illumination means 50. The two electrical contacts 22a and 22b are connected to the illumination means 50.

The inspection unit 10 comprises an accumulator 16, whereby one terminal of the accumulator 60 is connected to the first electrically conducting portion 11a, and the other terminal of the accumulator 60 is connected to the second electrically conducting portion 11b of the housing.

The illumination means 50 may be supplied with electrical energy of the accumulator 60 via the electrical couplings portion 11a of the inspection unit 10 to the electrical contact 22a of the external unit 20, and portion 11b of the inspection unit 10 to the electrical contact 22b of the external unit 20.

For all of the embodiments of the system according to the invention described above, the housing of the inspection unit 20 may be configured in a fluid- and/or gas-tight manner.

REFERENCE NUMERALS 10 inspection/maintenance unit
11a first electrically conducting portion of the inspection/maintenance unit 10
11b second electrically conducting portion of the inspection/maintenance unit 10
12 insulating layer/electrically insulating material
13 recess of the housing of the inspection/maintenance unit 10 for receiving the external unit 20
14 coupling recesses in/on the housing of the inspection/maintenance unit 10
15 pin/groove
20 external unit, with which the inspection/maintenance unit 10 can be coupled, e.g., a charging unit, an additional light, or the like
21 magnet on the external unit 20
22a first electrical contact of the external unit 20
22b second electrical contact of the external unit 20
23 spring member
30 recess
31 protective pane
40 camera module
50 illumination means
60 accumulator

The invention claimed is:

1. Sewer inspection or maintenance system having an electrical interface, wherein the sewer inspection or maintenance system comprises
a sewer inspection or maintenance unit, and
an external unit (20), which can be coupled electrically to the sewer inspection or maintenance unit (10), wherein
the sewer inspection or maintenance unit (10) comprises a housing,
the housing comprises a first electrically conducting portion (11a) and at least a second electrically conducting portion (11b), wherein the electrically conducting portions (11a; 11b) are electrically isolated from each other by means of an insulating layer (12),
the external unit (20) comprises a first electrical contact (22a) and at least a second electrical contact (22b),
wherein the electrically conducting portions (11a; 11b) and the electrical contacts (22a; 22b) are configured such that the first electrical contact (22a) can be brought into electrical contact with the first electrically conducting portion (11a), and the at least one second electrical contact (22b) can be brought into electrical contact with the at least one second electrically conducting portion (11b),
wherein the housing and the external unit (20) are configured such that they can be coupled to each other positively or in a force-fitting manner,
wherein the housing comprises a recess (13) with two walls, in which the external unit (20) can be received positively,
wherein the two walls of the recess (13) are electrically insulated from each other and are a part of the electrically conducting portions (11a; 11b) of the housing,
wherein the external unit (20) comprises radial blind holes,
wherein the external unit (20) comprises movable coupling members being arranged in the radial blind holes of the external unit, which during coupling of the external unit (20) to the housing, are pushed out at least partially of the radial blind holes to engage with coupling recesses (14) of the housing corresponding thereto in order to prevent the external unit (20) from being easily released from the housing,
wherein the coupling recesses 14 are located wall-sided within the recess (13), and
wherein the movable coupling members are the electrical contacts (22a, 22b).

2. The sewer inspection or maintenance system of claim 1, wherein an electrical consumer or energy storage, in particular, an accumulator, is arranged within the housing, and the electrically conducting portions (11a; 11b) are coupled to the electrical consumer or to the energy storage.

3. The sewer inspection or maintenance system of claim 1, wherein the electrically conducting portions (11a; 11b) of the housing comprise a magnetic or ferromagnetic material, at least in portions, and wherein the external unit (20) comprises at least one magnet (21), which magnetically cooperates with at least one of the magnetic portions, when the electrical contacts (22a; 22b) contact the electrically conducting portions (11a; 11b).

4. The sewer inspection or maintenance system of claim 1, wherein an actuating means, preferably a spring member (23), is respectively assigned to the coupling members.

5. The sewer inspection or maintenance system of claim 1, wherein the electrical contacts (22a; 22b) and the electrically conducting portions (11a; 11b) are provided for transmission of electrical energy.

6. The sewer inspection or maintenance system of claim 1, wherein at least one of the electrical contacts (22a; 22b) and at least one of the electrically conducting portions (11a; 11b) is usable for signal and data transmission, respectively.

7. The sewer inspection or maintenance system of claim 1, wherein the housing is formed in a fluid or gas-tight manner.

8. The sewer inspection or maintenance system of claim 1, wherein the external unit (20) comprises at least one of a charging unit, an illumination means, a permanent power supply, an external accumulator, and a data processing means.

9. The sewer inspection or maintenance system of claim 2, wherein the electrical consumer comprises at least one of a data processing means, an imaging means, an illumination means, a sensor, and a manipulator.

* * * * *